United States Patent [19]

Yarusso et al.

[11] Patent Number: 5,266,400
[45] Date of Patent: Nov. 30, 1993

[54] LOW VOLTAGE ELECTRON BEAM RADIATION CURED ELASTOMER-BASED PRESSURE SENSITIVE ADHESIVE TAPE

[75] Inventors: David J. Yarusso; Daniel C. Munson, both of St. Paul, Minn.

[73] Assignee: Minnesota Mining and Manufacturing Company, St. Paul, Minn.

[21] Appl. No.: 867,277

[22] Filed: Apr. 9, 1992

Related U.S. Application Data

[63] Continuation of Ser. No. 511,641, Apr. 20, 1990, abandoned.

[51] Int. Cl.$^5$ .............................................. C09J 7/02
[52] U.S. Cl. ...................................... 428/345; 428/355
[58] Field of Search ........................ 428/355, 343, 345

[56] References Cited

U.S. PATENT DOCUMENTS

| | | | |
|---|---|---|---|
| 2,410,078 | 10/1946 | Kellgren | 117/155 |
| 2,607,711 | 8/1952 | Hendricks | 117/122 |
| 2,956,904 | 10/1960 | Hendricks | 117/93 |
| 3,502,497 | 3/1970 | Crocker | 117/68.5 |
| 4,234,662 | 11/1980 | Pastor | 428/500 |
| 4,246,294 | 1/1981 | Jordan | 427/27 |
| 4,714,655 | 12/1987 | Bordoloi | 428/345 |
| 4,948,825 | 8/1990 | Sasaki | 428/355 |

FOREIGN PATENT DOCUMENTS 0278662  2/1988  European Pat. Off. .

OTHER PUBLICATIONS

Erickson, J. R., "EB Curable Rubber Has More Heat and Solvent Resistance"; *Adhesives Age;* Apr. 1986; pp. 22–24.

*Primary Examiner*—Jenna L. Davis
*Attorney, Agent, or Firm*—Gary L. Griswold; Walter N. Kirn; James V. Lilly

[57] ABSTRACT

A pressure sensitive tape comprising an electron beam radiation crosslinkable pressure sensitive adhesive on a radiation-degradable backing, the adhesive having been crosslinked by exposure to electron beam radiation in a fashion such that the dosage reduction through the adhesive layer is no greater than about 40%; the average dosage which is received by the backing is less than about 80% of that received by the adhesive, and a sufficient dose of beam energy has been provided to produce a gel content in the adhesive of at least about 20% by weight of the elastomer.

13 Claims, No Drawings

LOW VOLTAGE ELECTRON BEAM RADIATION CURED ELASTOMER-BASED PRESSURE SENSITIVE ADHESIVE TAPE

This is a continuation of application Ser. No. 07/511,641 filed Apr. 20, 1990 now abandoned.

TECHNICAL FIELD

The present invention relates to a pressure sensitive adhesive tape which is manufactured by crosslinking elastomer-based adhesive compositions contained on a radiation degradable substrate using controlled low voltage electron beam radiation. Surprisingly, a balance of desired adhesive and backing properties are obtained, a characteristic hereto unavailable by previously taught electron beam irradiation techniques.

BACKGROUND ART

The use of electron beam radiation, i.e., a beam of electrons accelerated through an electric potential, to cure or crosslink polymers used in pressure sensitive adhesives is known in the art. For example, U.S. Pat. No. 2,956,904 describes the use of high energy electron beam radiation to crosslink or cure pressure sensitive adhesives to improve the shear properties thereof. The benefits claimed for radiation cure versus conventional sulfur cure include higher shear performance without loss of tack, as well as the absence of staining on lightly colored painted surfaces, typically caused by the presence of sulfur compounds in the adhesive. The radiation disclosed therein was the discharge of high energy electrons from a cathode ray tube powered by a resonant transformer operated at 1000 kV. There is no disclosure therein of using low voltage radiation.

It is also known that electron beam radiation applied at doses necessary to crosslink pressure sensitive adhesives to their desired level of performance (0.5 to 10.0 MRad) can damage many of the backings commonly used to form pressure sensitive tapes, such as cellulose-based backings (e.g., paper and cotton cloth), polypropylene film, polyvinyl chloride film, and polytetrafluoroethylene film.

U.S. Pat. No. 4,246,297 discloses the use of a critically adjusted electron beam taught to be capable of curing coatings on a radiation-sensitive substrate. The patent describes the effective beam energy as being in the range of 50 to 300 keV for curing pressure sensitive adhesives on temperature sensitive webs such as paper, plastic and the like, with doses of from 0.5 to 5 MRad. The beam energy of the reference is taught to be controlled through a combination of the accelerating potential and the energy loss of the beam as it travels through the various layers of material prior to reaching the coating to be cured. Such layers include the foil window separating the high vacuum chamber of the electron gun and the atmosphere, a layer of nitrogen gas between the foil and the sample to be cured, and any covering liner over the coating to be cured.

This reference discloses a process for assertedly achieving substantially uniform electron beam cure of a coating while ensuring minimal irradiation of the substrate, e.g., a tape backing. However, the examples described therein disclose a ratio of the irradiation dose at the front of the coating to be cured to that at the back of the coating, i.e., at the coating/backing interface, of 5:1. We have determined that such a degree of dose variation through the thickness of the adhesive is unacceptable for pressure sensitive adhesive coatings because upon removal of the tape from a substrate, cohesive failure of the adhesive results and adhesive residue is undesirably left on the substrate. Pressure sensitive adhesives require a fairly uniform cure throughout the thickness of the adhesive.

SUMMARY OF THE INVENTION

In accordance with the invention there is provided a pressure sensitive adhesive tape comprising an elastomer-based pressure sensitive adhesive on a radiation-degradable backing, the pressure sensitive adhesive having been crosslinked by exposure to a beam of electrons which have been accelerated through an adequate potential such that the reduction in dose through the adhesive layer is no greater than about 40%, and the average dose received by the backing is less than about 80% of the average dose received by the adhesive, with a sufficient dose of beam energy to produce a gel content in the adhesive of at least about 20% by weight of the elastomer.

In this manner, a balance of properties is found in the tape not heretofore available in electron beam radiation cured systems.

The balance of properties relates to the adhesive characteristics balanced against the potential degradation of the backing by an exposure to electron beam radiation. We have found that a narrow window of potential is available which will achieve this balance and thus provide a product exhibiting the desired characteristics.

DETAILED DESCRIPTION

The pressure sensitive adhesive tape of the present invention comprises a radiation degradable backing coated with an elastomer-based pressure sensitive adhesive. A release coating may be optionally coated on the opposite side or a separate release liner can be used. The adhesive typically comprises one or more electron beam crosslinkable elastomers and one or more tackifying resins, optionally containing fillers and antioxidants. Examples of unsaturated elastomers which can be utilized include natural rubber, synthetic polyisoprene, polybutadiene, styrene/butadiene rubber (SBR), and block copolymers where one of the blocks consists of one of the above elastomers, such as styrene-isoprene-styrene triblock or starblock polymers, as well as acrylic, and silicone elastomers.

Tackifying resins include those known in the art of pressure sensitive adhesive manufacture, examples including polyterpenes, synthetic hydrocarbon resins, rosins, and rosin derivatives such as rosin esters. Antioxidants, similarly known in the art, include, as examples, phenolic types, such as 2,4-di(tertamyl)hydroquinone and dithiocarbamate types such as zinc dithiobutylcarbamate. Many fillers can be used, examples including zinc oxide, silica, carbon black and calcium carbonate.

The adhesive can be applied to the backing by any of the commonly known means, examples including solvent casting, latex casting, calendering the adhesive into a film followed by lamination to the backing, and extrusion or hot melt coating of the adhesive onto the backing. Thicknesses of adhesive useful for the tapes of the present invention comprise those commonly used in the industry and are from about 15 $\mu$m to about 75 $\mu$m.

Backings for the tapes of the invention include those which are radiation degradable, including paper, saturated papers, vinyl films, cellulose-based woven and non-woven fabrics, polypropylene based non-woven fabrics, polypropylene films, and polytetrafluoroethylene films.

The backside, i.e., the non-adhesive containing side, of the backing may be precoated with a release material to facilitate easy unwind of a completed roll of tape. Furthermore, the side of the backing to which the adhesive is to be applied may also be pretreated or coated with a primer material prior to application of the adhesive to enhance bonding of the adhesive to the backing.

The coated tapes are exposed to electron beam radiation from the adhesive side to suitably crosslink the elastomer in the adhesive to provide adequate resistance to flow in the adhesive. The precise degree of crosslinking depends on the specific tape construction and application, but in general, tapes which are the subject of this invention would be crosslinked to the point where at least 20% of the elastomer is insoluble by the gel content test described hereinafter.

The unique balance of adhesive and backing properties of the tapes of the present invention are achieved through control of the voltage, i.e., the accelerating potential of a beam of electrons, to surprisingly narrow ranges. We have found that most practical tape constructions can be made within narrow voltage ranges that fall within a broader range of 75 kV to 175 kV. For example, a specific tape construction may require a range of between 100 kV to 110 kV to produce a tape with acceptable backing and adhesive properties. Such control of the voltage provides adequate uniformity of adhesive cure through the thickness thereof, while limiting backing damage or degradation to acceptable levels.

The specific range of voltages found useful is dependent on the adhesive and backing thicknesses as well as the degradation of the beam energy prior to impingement on the adhesive sample. We have found that the useful voltage range can be defined by the criteria described hereinbelow.

The profile of dose vs. depth of penetration in reference materials has been described in the literature[1] by a polynominal function approximation to measured data as follows:

$$G(f) = C_1 + C_2 f + C_3 f^2 + C_4 f^3,$$

with the constants having the following values:
$C_1$: 0.74,
$C_2$: 4.7,
$C_3$: −8.9, and
$C_4$: 3.5,
wherein f is a dimensionless penetration distance defined by:

$$f = \frac{z}{R_g}$$

wherein z is the penetration distance and $R_g$ is the Grun range in the material. The Grun range, as defined in the literature[2], is the maximum distance of penetration and is related to the density of the material and the accelerating potential of the electrons as follows:

$$R_g = \frac{0.046}{\rho} V^{1.75}$$

where:
$R_g$ is the Grun range expressed in μm, $\rho$ is the density of the material in g/cm³, and
V is the accelerating potential in kV.
Thus f can be calculated as:

$$f = \frac{z\rho}{K(V)}$$

where: $K(V) = 0.046 \, V^{1.75}$ again with V expressed in kV and K(V) expressed in μm g/cm³.

[1] T. E. Everhart, A. J. Gonzalez, P. H. Hoff, and N. C. MacDonald, 6th International Congress for Electron Microscopy, Kyoto (1966), p. 201.
[2] A E. Grun, Z. Naturforsch 12A (1957), pp. 85-95.

For electron beam propagation through multiple layers of various densities, one simply calculates f by summing the values of the product of layer thickness multiplied by density and dividing by K(V). In commercial electron beam processors, the electrons are accelerated through an electric potential in a vacuum chamber, then pass through a thin metal foil, and a gas filled gap before impinging on the sample. Thus, the important values of f for defining the invention are as follows:

$$f_1 = \frac{t_w \rho_w}{K(V)}$$

$$f_2 = f_1 + \frac{t_g \rho_g}{K(V)}$$

$$f_3 = f_2 + \frac{t_a \rho_a}{K(V)}$$

$$f_4 = f_3 + \frac{t_b \rho_b}{K(V)}$$

The subscripts w, g, a, and b refer to the titanium foil window, the nitrogen gas space, the adhesive, and the backing, respectively. The symbol t refers to the thickness of each layer of material. The density of the material is symbolized by $\rho$.

Thus, the dose at the front of the adhesive layer is proportional to $G(f_2)$ and the dose at the back of the adhesive is proportional to $G(f_3)$.

The average dose received in a layer can be calculated from the integral of G(f) with respect to f, which is simply expressed by the function H(f) as follows:

$$H(f) = C_1 f + \frac{C_2}{2} f^2 + \frac{C_3}{3} f^3 + \frac{C_4}{4} f^4$$

wherein the constants are identical to those defined above. The energy delivered in a layer per unit area is proportional to the difference between the value of H(f) at the back of that layer and the value at the front of that layer. The average dose in a layer is the delivered energy per unit area divided by the mass of material in the layer per unit area, given by $\rho t$ for the layer.

For the present invention, it has been found that the accelerating potential must be high enough to provide a dose at the backing side of the adhesive which is no less than 60%, and preferably no less than 70%, of the dose at the front of the adhesive. Thus, one condition on the voltage is that it must be high enough such that:

$$\frac{G(f_3)}{G(f_2)} \geq 0.6$$

and more preferably, $$\frac{G(f_3)}{G(f_2)} \geq 0.7$$

In other words, the reduction in dose through the adhesive layer is no greater than about 40% and preferably, no greater than 30%.

It has also been found that the accelerating potential must not be so high as to deliver an average dose in the backing greater than 80% of that received in the adhesive, and preferably not greater than 60% of that received in the adhesive, in order to substantially reduce backing degradation or damage, while allowing adequate cure of the adhesive. Thus, the second condition on the voltage is that it must be low enough such that:

$$\frac{H(f_4) - H(f_3)}{H(f_3) - H(f_2)} \cdot \frac{\rho_a t_a}{\rho_b t_b} \leq 0.8$$

or more preferably, $$\frac{H(f_4) - H(f_3)}{H(f_3) - H(f_2)} \cdot \frac{\rho_a t_a}{\rho_b t_b} \leq 0.6$$

These two conditions lead to heretofore unrecognized very narrow ranges of useful voltage which are critically dependent on adhesive and backing thicknesses as will be described in more detail in the examples.

Within the voltage ranges described above, we have further found that doses of less than about 12 MRad are useful. Above 12 MRad, even with properly chosen voltage, the backing will generally be unacceptably degraded.

To demonstrate the calculation of the voltage ranges as described herein, the following Table 1 has been constructed. For each of these cases, we assumed the presence of a titanium foil window 12.5 μm thick. The titanium density is 4.51 g/cm³. The nitrogen gap between the foil window and the adhesive surface is assumed to be 19 mm with a density of $1.25 \times 10^{-3}$ g/cm³. The adhesive density was assumed to be 1.0 g/cm3 and the backing density was chosen to be 0.78 g/cm³ (characteristic of a conventional saturated paper masking tape backing).

TABLE 1

| Adhesive Thickness (μm) | Backing Thickness (μm) | Absolute Minimum Potential (kV) | Preferred Minimum Potential (kV) | Preferred Maximum Potenial (kV) | Absolute Maximum Potential (kV) |
| --- | --- | --- | --- | --- | --- |
| 12.7 | 50.8 | 85 | 90 | 100 | 114 |
| 38.1 | 50.8 | 106 | 112 | 115 | 130 |
| 76.2 | 50.8 | 128 | 134 | 133 | 149 |
| 12.7 | 114 | 85 | 90 | 118 | 134 |
| 38.1 | 114 | 106 | 112 | 130 | 147 |
| 76.2 | 114 | 128 | 134 | 146 | 164 |
| 12.7 | 152 | 85 | 90 | 127 | 144 |
| 38.1 | 152 | 106 | 112 | 138 | 156 |
| 76.2 | 152 | 128 | 134 | 153 | 172 |

EXAMPLES 1-24

To demonstrate the value of electron beam curing of pressure sensitive adhesive tapes by the conditions of this invention, a series of tape examples were prepared. For all of these, a pressure sensitive adhesive with the formulation described in Table 2 was used. The rubbers were milled together on a conventional two roll mill and the zinc oxide and antioxidant added and blended. The millbase and the tackifying resin were then dissolved in heptane and coated onto a paper masking tape backing made as described in U.S. Pat. No. 2,410,078, incorporated herein by reference. The paper backing is coated with a release coating such as exemplified by U.S. Pat. Nos. 2,607,711 and 3,502,497. The adhesive was coated at three thicknesses and irradiated with an ESI "Electrocurtain" machine at accelerating potentials from 100 to 170 kV in 10 kV increments with a dose of 5 MRad. The current necessary to deliver this dose was determined by dosimetry with a thin (8 μm) Nylon chip containing a radiachromic dye from Far West Technologies, Inc. These chips are essentially uniformly irradiated at all of the voltages of interest because they are so thin. Adhesive thicknesses were measured by forming a sandwich of two pieces of tape, measuring the total thickness, subtracting twice the backing thickness and dividing by two.

The optimal voltage ranges as calculated by the aforementioned criteria are given in Table 3.

Degradation of the paper backing was measured by the reduction in its flexibility as indicated by the number of cycles to failure in the MIT Folding Endurance Test. The tests were conducted on a 0.5 inch (1.25 cm) wide strip of tape on an MIT Flex Tester Model #1 made by Tinius Olsen Testing Machine Company of Willow Grove, Pa.

Crosslinking of the adhesive was measured by the adhesive gel content and the swell ratio. The gel content of the examples is determined by soaking a piece of tape in toluene for 24 hours to extract the portion of the adhesive that is not crosslinked, determining the amount of gelled rubber in the extracted sample, and dividing the amount of gelled rubber by the amount of rubber in the adhesive formulation since only the rubber is typically crosslinked.

The swell ratio is determined by soaking a tape sample in toluene for 24 hours, blotting off the excess solvent from the sample, and determining the amount of swelling by calculating the ratio of the swollen gel weight to that of the dried gel. We also observed whether or not the gel remained bonded to the backing.

A 5 MRad dose was illustrative. From Table 5, one can see that the gel content for these adhesives is about 60% of the rubber which is within the range of useful gel contents. One can see from Tables 6 and 7 that when the accelerating potential is less than the lower limit defined by the invention, the adhesive is poorly cured at the backing side, as indicated by the fact that the cured portion of the adhesive (the gel) floats off the backing (Table 7), because the layer near the backing is soluble and because the average swell ratio of the cured adhesive is considerably higher than the limiting value at high voltage (Table 6). The swell ratio is a measure of the average crosslink density. The higher the swell ratio, the lower the crosslink density. On the other hand, at voltages higher than the upper limits set by the invention, the backing properties are degraded to an unacceptable level. This is illustrated in Table 4. We have found that when the MIT Flex life is below about 300 cycles, paper backings are unacceptably brittle and tend to tear when the tape is removed rapidly from a surface to which it is tightly adhered.

EXAMPLES 25-42

A similar study was done with the same tape constructions, but this time choosing the voltage to be optimal according to the criteria of this invention, and varying the dose. The gel content and MIT flex for these examples, are given in Tables 8 and 9, respectively. It can be seen that for this specific adhesive system, to achieve the useful range of gel contents (greater than 20%), one would need to use doses greater than 2 MRad. However, a dose of 12 MRad produces unacceptable backing properties, even within the optimal voltage range of the invention. Thus, there is a maximum useful dose range for the invention as well as a limited voltage range.

EXAMPLES 43-45

Tape samples were prepared having an adhesive thickness of 34 μm and exposed to voltages of 100 kV, 125 kV, and 175 kV, at a dose of 3 MRad. The tapes were then rolled and the force required to unwind the tape from the roll was measured by attaching the free end of the tape to a scale and pulling on the tape at a rate of 90 inches per minute (228.6 cm per minute). The unwind force is measured in Newtons per centimeter, and the data are shown in Table 10. An unwind force of less than about 3 N/cm, and preferably less than 2.5 N/cm, is desired. At 175 kV, the unwind force is unacceptable.

The following examples illustrate that operating within these limits can produce tapes with unique, functionally important properties which are unattainable outside of these limits. Only the first example, which is within the scope of the present invention, produces an acceptable masking tape with regard to all the properties discussed above.

EXAMPLE 46

The adhesive described in Table 2 was coated on the aforementioned saturated paper backing at a coating thickness of 34 μm and irradiated with an ESI "Electrocurtain" processor operated at 125 kV and a dose of 10 MRad. According to the methods of this invention, the calculated ratio of the radiation dose at the adhesive backing side to that at the front adhesive surface was 0.87 and the ratio of average backing dose to average adhesive dose was 0.55. The tape produced had an average flex life of 317 cycles by the MIT flex test, and removed cleanly with no adhesive transfer from a painted panel after exposure to 265° F. and peeling hot. The peel adhesion removal force from the backside of the tape was measured by adhering a strip of tape to a hard surface with a 2 kg hard rubber roller. A second strip of tape was adhered onto the backside of the first strip in a like manner. The adhesion value was measured by attaching a scale to a free end of the tape and pulling the scale away at a rate of 90 inches per minute (228.6 cm per minute) at an angle of 180°. The peel adhesion removal force was 1.2 N/cm. Generally, the desired removal force is less than about 2.0 N/cm.

COMPARATIVE EXAMPLE 1

The construction of Example 10 was irradiated with the processor operating at 175 kV and a dose of 10 MRad. The calculated ratio of dose at the back to that at the front of the adhesive layer was 1.06. The backing dose to adhesive dose ratio was calculated to be 0.99 under these conditions. The tape had an average flex life of only 53 cycles, but did remove cleanly from the painted panel at 265° F. The peel adhesion removal force from the backing was 2.5 N/cm which is unacceptably high for masking tape.

COMPARATIVE EXAMPLE 2

The construction of Example 10 was irradiated with the processor operating at 100 kV and a dose of 10 MRad. The calculated ratio of dose at the back to that at the front of the adhesive layer was 0.53. The backing dose to adhesive dose ratio was calculated to be 0.13. The tape had a flex life of 430 cycles and a peel adhesion removal force from the backing of 1.2 N/cm, but some of the adhesive transferred to the painted panel when the tape was removed at 265° F., because of the insufficient cure of the back side of the adhesive.

TABLE 2

| Component: | Parts by weight: |
|---|---|
| Ribbed smoked sheet natural rubber | 50 |
| Ameripol "Synpol" 1011A (SBR) | 50 |
| "Escorez" 1304, a tackifier available from Exxon | 50 |
| zinc oxide | 12.5 |
| "Wingstay" L, an antioxidant available from Goodyear | 1.0 |

TABLE 3

Thicknesses and Voltage Ranges of Example Constructions

| Adhesive Thickness (μm) | Absolute Minimum Potential (kV) | Preferred Minimum Potential (kV) | Preferred Maximum Potential (kV) | Absolute Maximum Potential (kV) |
|---|---|---|---|---|
| 14.5 | 87 | 92 | 119 | 135 |
| 36.6 | 105 | 111 | 129 | 146 |
| 73.2 | 126 | 133 | 145 | 162 |

TABLE 4

MIT Flex life (cycles) vs. Adhesive Thickness and Accelerating Potential

| | Coating Thickness (μm) | | |
|---|---|---|---|
| kV | 14.5 | 36.6 | 73.2 |
| 100 | 678 | 635 | 602 |
| 110 | 359 | 585 | 614 |
| 120 | 355 | 365 | 531 |
| 130 | 243 | 334 | 402 |
| 140 | 233 | 277 | 425 |
| 150 | 150 | 171 | 346 |
| 160 | 124 | 188 | 275 |
| 170 | 76 | 190 | 231 |

TABLE 5

Gel Content (% of elastomer) vs. Adhesive Thickness and Accelerating Potential

| | Coating Thickness (μm) | | |
|---|---|---|---|
| kV | 14.5 | 36.6 | 73.2 |
| 100 | 35.4 | 21.9 | 14.9 |
| 110 | 44.0 | 45.0 | 28.4 |
| 120 | 53.3 | 59.6 | 52.9 |
| 130 | 54.8 | 51.9 | 55.8 |
| 140 | 56.8 | 51.7 | 68.8 |
| 150 | 61.0 | 56.6 | 59.3 |
| 160 | 61.4 | 45.1 | 57.7 |
| 170 | 58.6 | 58.4 | 57.8 |

TABLE 6

Swell Ratio vs. Adhesive Thickness and Accelerating Potential

| kV | Coating Thickness (μm) | | |
|---|---|---|---|
| | 14.5 | 36.6 | 73.2 |
| 100 | 83 | 108 | 100 |
| 110 | 67 | 109 | 108 |
| 120 | 44 | 78 | 85 |
| 130 | 37 | 51 | 90 |
| 140 | 40 | 46 | 78 |
| 150 | 35 | 40 | 61 |
| 160 | 33 | 57 | 51 |
| 170 | 35 | 37 | 49 |

TABLE 7

Floating (−) or Bonded (+) Gel vs. Adhesive Thickness and Accelerating Potential

| kV | Coating Thickness (μm) | | |
|---|---|---|---|
| | 14.5 | 36.6 | 73.2 |
| 100 | + | − | − |
| 110 | + | − | − |
| 120 | + | + | − |
| 130 | + | + | + |
| 140 | + | + | + |
| 150 | + | + | + |
| 160 | + | + | + |
| 170 | + | + | + |

TABLE 8

Gel Content (% of elastomer) vs. Adhesive Thickness and Dose

| | Coating Thickness (μm) | | |
|---|---|---|---|
| Thickness: | 14.5 | 36.6 | 73.2 |
| kV used: | 110 | 125 | 135 |
| Dose (MRad): | | | |
| 0.5 | 6 | 3 | 1 |
| 2.0 | 22 | 31 | 33 |
| 4.0 | 34 | 44 | 48 |
| 6.0 | 33 | 53 | 55 |
| 8.0 | 56 | 57 | 63 |
| 12.0 | 66 | 69 | 71 |

TABLE 9

MIT Flex Life (cycles) vs. Adhesive Thickness and Dose

| | Coating Thickness (μm) | | |
|---|---|---|---|
| Thickness: | 14.5 | 36.6 | 73.2 |
| kV used: | 110 | 125 | 135 |
| Dose (MRad): | | | |
| 0.5 | 600 | 580 | 520 |
| 2.0 | 591 | 641 | 584 |
| 4.0 | 394 | 557 | 490 |
| 6.0 | 538 | 361 | 332 |
| 8.0 | 367 | 376 | 300 |
| 12.0 | 303 | 200 | 262 |

TABLE 10

Unwind Force vs. Voltage at 3 MRad Dose

| Voltage (kV) % | Unwind Force - N/cm |
|---|---|
| 100 | 2.18 |
| 125 | 2.08 |
| 175 | 3.82 |

What is claimed is:

1. A pressure sensitive adhesive tape comprising at least one electron beam radiation crosslinkable elastomer-based pressure sensitive adhesive layer on a radiation degradable backing, said pressure sensitive adhesive having been crosslinked by exposure to a beam of electrons accelerated through an adequate potential such that the reduction in dose through said pressure sensitive adhesive is no greater than 40% and the average dose received by said backing is less than about 80% of the average dose received by said adhesive, and with a sufficient dose of beam energy to produce a gel content in said adhesive of at least about 20% by weight of said elastomer, said potential selected from a voltage in a range of between about 75 and 175 kilovolts, and the dose to the pressure sensitive adhesive being less than about 12 megarads, wherein, within said range of potential, said voltage utilized is dependent upon (a) the thickness of said adhesive layer, (b) the thickness of said backing, and (c) the degradation of the electron beam prior to impingement on said adhesive layer; and further wherein said voltage range for a specific combination of (a), (b) and (c) can be calculated from the following equations assuming said electron beam passes through a foil window and gas space prior to impingement on said adhesive layer;

$$\frac{G(f_3)}{G(f_2)} \geq 0.6, \text{ and} \tag{1}$$

$$\frac{H(f_4) - H(f_3)}{H(f_3) - H(f_2)} \cdot \frac{\rho_a t_a}{\rho_b t_b} \leq 0.8 \tag{2}$$

wherein the function G(f) describes the profile of dose versus depth of penetration given by the following equations for purposes herein:

$$G(f_3) = C_1 + C_2 f_3 + C_3 f_3^2 + C_4 f_3^3$$

$$G(f_2) = C_1 + C_2 f_2 + C_3 f_2^2 + C_4 f_2^3$$

wherein:

$C_1 = 0.7$ $C_2 = 4.7$ $C_3 = -8.9$ $C_4 = 3.5$ and wherein f is a dimensionless penetration distance defined for the above equation as follows:

$$f_3 = \frac{t_w \rho_w + t_g \rho_g + t_a \rho_a}{K(V)}$$

$$f_2 = \frac{t_w \rho_w + t_g \rho_g}{K(V)}$$

wherein:
$t_w$ = thickness of the foil window expressed in microns
$\rho_w$ = density of the foil expressed in g/cm$^3$
$t_g$ = thickness of the gas space expressed in microns
$\rho_g$ = density of the gas expressed in g/cm$^3$
$t_a$ = thickness of the adhesive layer expressed in microns
$\rho_a$ = density of the adhesive expressed in g/cm$^3$
$K(V) = 0.046 \, V^{1.75}$ expressed in micron-g/cm$^3$
V is the accelerating potential expressed in kilovolts
wherein H(f) describes the average dose received in a layer defined for the above equations as follows:

$$H(f_4) = c_1 f_4 + \frac{c_2}{2} f_4^2 \frac{c_3}{3} f_4^3 \frac{c_4}{4} f_4^4$$

-continued
$$H(f_3) = c_1 f_3 + \frac{c_2}{2} f_3^2 \frac{c_3}{3} f_3^3 \frac{c_4}{4} f_3^4$$

wherein:

$$f_4 = \frac{t_w \rho_w + t_g \rho_g + t_a \rho_a + t_b \rho_b}{K(V)}$$

wherein:
  $C_1, C_2, C_3, C_4, f_3, t_w, \rho_w, t_g, \rho_g, t_a, \rho_a, K(V)$ are defined above,
and wherein:
  $t_b$ = thickness of the backing expressed in microns, and
  $\rho_b$ = density of the backing expressed in g/cm$^3$.

2. The tape of claim 1 wherein said reduction in dose is no greater than about 30% and said average dose received by said backing is less than about 60% of said average dose received by said adhesive.

3. The tape of claim 1 wherein said backing is selected from the group consisting of paper, cellulose-based woven fabrics, cellulose-based non-woven fabrics, polypropylene films, polypropylene based nonwovens, vinyl films, polytetrafluoroethylene films, and combinations thereof.

4. The tape of claim 1 wherein said elastomer is selected from the group consisting of polyisoprene, natural rubber, polybutadiene, styrene/butadiene copolymers, styrene/isoprene copolymers, acrylics, and silicones.

5. The tape of claim 1 wherein said adhesive further includes a tackifying resin.

6. The tape of claim 1 wherein said adhesive further includes an antioxidant.

7. The tape of claim 1 wherein said adhesive further includes fillers.

8. The tape of claim 1 wherein said backing is primed to improve adhesion of said adhesive thereto.

9. The tape of claim 1 wherein a release coating is applied to said backing opposite the side thereof coated with adhesive.

10. The tape of claim 1 wound upon itself in roll form.

11. A convolutely wound roll of pressure sensitive adhesive tape according to claim 1.

12. The tape of claim 1 wherein the adhesive layer has a thickness between about 15 and 75 micrometers.

13. A pressure sensitive adhesive tape comprising at least one electron beam radiation crosslinkable elastomer-based pressure sensitive adhesive layer on a radiation degradable backing, said pressure sensitive adhesive having been crosslinked by exposure to a beam of electrons accelerated through an adequate potential such that the reduction in dose through said pressure sensitive adhesive is no greater than 40% and the average dose received by said backing is less than about 80% of the average dose received by said adhesive, and with a sufficient dose of beam energy to produce a gel content in said adhesive of at least about 20% by weight of said elastomer, said potential selected from a voltage in a range of between about 75 and 175 kilovolts, and the dose to the pressure sensitive adhesive being less than about 12 megarads, wherein, within said range of potential, said voltage utilized is dependent upon (a) the thickness of said adhesive layer, (b) the thickness of said backing, and (c) the degradation of the electron beam prior to impingement on said adhesive layer; and further wherein said voltage range for a specific combination of (a), (b) and (c) can be calculated from the following equations assuming said electron beam passes through a titanium foil window and nitrogen gas space prior to impingement on said adhesive layer:

$$\frac{G(f_3)}{G(f_2)} \geq 0.6, \text{ and} \quad (1)$$

$$\frac{H(f_4) - H(f_3)}{H(f_3) - H(f_2)} \cdot \frac{\rho_a t_a}{\rho_b t_b} \leq 0.8 \quad (2)$$

wherein the function G(f) describes the profile of dose versus depth of penetration given by the following equations for purposes herein:

$$G(f_3) = C_1 + C_2 f_3 + C_3 f_3^2 + C_4 f_3^3$$

$$G(f_2) = C_1 + C_2 f_2 + C_3 f_2^2 + C_4 f_2^3$$

wherein:

$C_1 = 0.7$ $C_2 = 4.7$ $C_3 = -8.9$ $C_4 = 3.5$ and wherein f is a dimensionless penetration distance defined for the above equation as follows:

$$f_3 = \frac{t_w \rho_w + t_g \rho_g + t_a \rho_a}{K(V)}$$

$$f_2 = \frac{t_w \rho_w + t_g \rho_g}{K(V)}$$

wherein:
  $t_w$ = thickness of the titanium foil window expressed in microns
  $\rho_w$ = density of the titanium foil expressed in g/cm$^3$
  $t_g$ = thickness of the nitrogen gas space expressed in microns
  $\rho_g$ = density of the nitrogen gas expressed in g/cm$^3$
  $t_a$ = thickness of the adhesive layer expressed in microns
  $\rho_a$ = density of the adhesive expressed in g/cm$^3$
  $K(V) = 0.046 \, V^{1.75}$ expressed in micron-g/cm$^3$
  V is the accelerating potential expressed in kilovolts
wherein H(f) describes the average dose received in a layer defined for the above equations as follows:

$$H(f_4) = c_1 f_4 + \frac{c_2}{2} f_4^2 \frac{c_3}{3} f_4^3 \frac{c_4}{4} f_4^4$$

$$H(f_3) = c_1 f_3 + \frac{c_2}{2} f_3^2 \frac{c_3}{3} f_3^3 \frac{c_4}{4} f_3^4$$

wherein:

$$f_4 = \frac{t_w \rho_w + t_g \rho_g + t_a \rho_a + t_b \rho_b}{K(V)}$$

wherein:
  $C_1, C_2, C_3, C_4, f_3, t_w, \rho_w, t_g, \rho_g, t_a, \rho_a, K(V)$ are defined above, and wherein
  $t_b$ = thickness of the backing expressed in microns, and
  $\rho_b$ = density of the backing expressed in g/cm$^3$.

* * * * *

UNITED STATES PATENT AND TRADEMARK OFFICE
CERTIFICATE OF CORRECTION

PATENT NO. : 5,266,400
DATED : NOVEMBER 30, 1993
INVENTOR(S) : YARUSSO, DAVID J. AND MUNSON, DANIEL C.

It is certified that error appears in the above-indentified patent and that said Letters Patent is hereby corrected as shown below:

Col. 10, line 31, "$G(f_3) = c_1 + c_2 f_3 + c_3 f_3^2 + c_1 f_3^3$" should read -- $G(f_3) = c_1 + c_2 f_3 + c_3 f_3^2 + c_4 f_3^3$ --.

Signed and Sealed this

Second Day of August, 1994

Attest:

BRUCE LEHMAN

*Attesting Officer*  *Commissioner of Patents and Trademarks*